United States Patent

Suzuki

[11] Patent Number: 5,751,495
[45] Date of Patent: May 12, 1998

[54] EYEPIECE LENS

[75] Inventor: Masami Suzuki, Kanagawa-ken, Japan

[73] Assignee: Nikon Corporation, Tokyo, Japan

[21] Appl. No.: 692,482

[22] Filed: Aug. 6, 1996

[30] Foreign Application Priority Data

Aug. 10, 1995 [JP] Japan ................................. 7-225832

[51] Int. Cl.$^6$ ................................. G02B 25/00
[52] U.S. Cl. ................................. 359/644; 359/686; 359/780
[58] Field of Search ................................. 359/643, 644, 359/686, 733, 734, 754, 756, 757, 761, 771, 772, 780-781, 783

[56] References Cited

U.S. PATENT DOCUMENTS

| 3,638,996 | 2/1972 | Klein | 359/643 |
| 4,249,793 | 2/1981 | Uehara | 359/644 |
| 4,286,844 | 9/1981 | Nagler | 359/644 |
| 5,227,918 | 7/1993 | Suzuki et al. | |

FOREIGN PATENT DOCUMENTS

| 1728837 | 4/1992 | U.S.S.R. | 359/644 |
| 0673353 | 6/1952 | United Kingdom | 359/780 |

*Primary Examiner*—Hoa Q. Pham
*Attorney, Agent, or Firm*—Oliff & Berridge, P.L.C.

[57] ABSTRACT

An eyepiece lens has an apparent field of no less than 40°, and minimizes eye relief error. The eye relief includes a distance between a lens surface closest to an eye point side in the eyepiece lens and an eye point. The eyepiece lens comprises an assembly of lens groups including, from the eye point, a first lens group $G_1$ that includes one positive lens component, a second lens group $G_2$ with positive refracting power that includes a cemented lens having a negative lens component and a positive lens component, a third lens group $G_3$ with positive refracting power that includes a cemented lens having a positive lens component and a negative lens component, and a fourth lens group $G_4$ that includes one negative lens component. The assembly of lenses is configured such that $1.4 \leq |R7/R4|$, wherein R4 is a radius of curvature of a cemented surface of the negative lens component and the positive lens component of the second lens group G2, and R7 is a radius of curvature of a cemented surface of the positive lens component and the negative lens component of the third lens group $G_3$.

18 Claims, 6 Drawing Sheets

EYEPIECE LENS

BACKGROUND OF THE INVENTION

1. Field of the Invention

The present invention relates to an eyepiece lens for a telescope or a microscope.

2. Description of Related Art

Conventionally, multiple cemented lenses are used in an eyepiece lens to correct various aberrations. However, conventional assemblies of multiple cemented lenses produce an error in the eye relief, i.e., the distance between a lens surface closest to an eye point side in an eyepiece lens and an eye point, because of the wavelength of light. This error is more pronounced as the view field becomes wider. The relief error of the eyepiece lens is manifested wherein the view field appears blue or yellow as a user moves his/her eyes closer or further away from the lens.

SUMMARY OF THE INVENTION

It is, therefore, an object of the present invention to provide an eyepiece lens that produces the benefits of multiple cemented lenses, i.e., correcting aberrations, while minimizing the eye relief error due to wavelength.

The invention is an eyepiece lens that has an apparent field of no less than 40°, and minimizes eye relief error, the eye relief including a distance between a lens surface closest to an eye point side in the eyepiece lens and an eye point. The eyepiece lens includes, from the eye point, a first lens that includes one positive lens component, a second lens with positive refracting power that includes a cemented lens having a negative lens component and a positive lens component, a third lens with positive refracting power that includes a cemented lens having a positive lens component and a negative lens component, and a fourth lens that includes one negative lens component. The eyepiece lens also includes a mechanism for configuring the eyepiece lens such that $1.4 \leq |R7/R4|$, wherein R4 is a radius of curvature of a cemented surface of the negative lens component and the positive lens component of the second lens group G2, and R7 is a radius of curvature of a cemented surface of the positive lens component and the negative lens component of the third lens group G3.

DETAILED DESCRIPTION OF PREFERRED EMBODIMENTS

Figure 1:
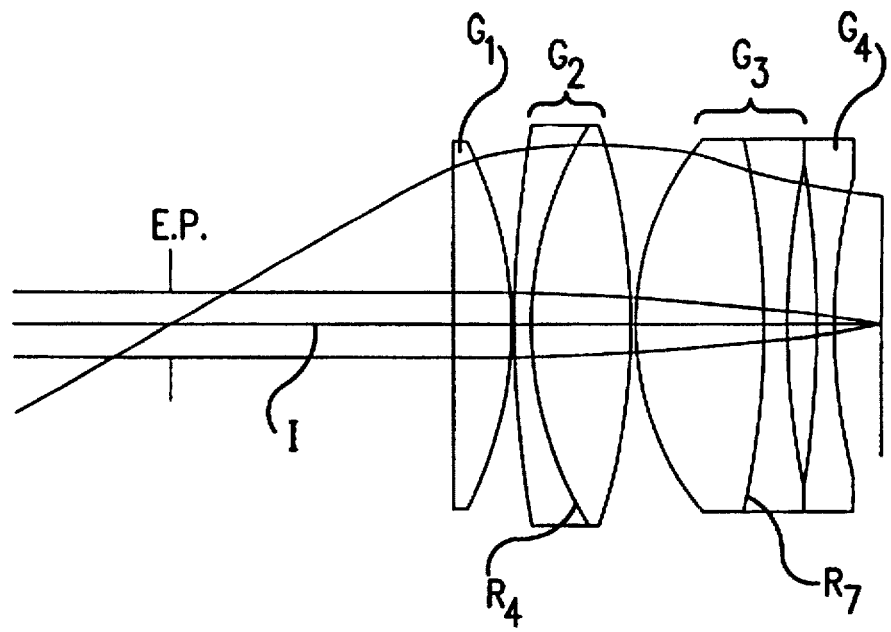
FIG. 1 is a side elevational view of an embodiment of an eyepiece lens in accordance with the invention.

The present invention is an eyepiece lens that has an apparent field of no less than 40°. The eyepiece lens comprises the following components, in order from the eye point, a first lens group $G_1$ that includes a positive lens component, a second lens group $G_2$ with positive refracting power that includes a cemented lens having a negative lens component as well as a positive lens component, a third lens group $G_3$ with positive refracting power that includes a cemented lens having a positive lens component and a negative lens component, and a fourth lens group $G_4$ that includes one negative lens component. The following formula is satisfied, wherein R4 is the radius of curvature of the cemented surface of the negative lens component and the positive lens component of the second lens group $G_2$ and R7 is the radius of curvature of the cemented surface of the positive lens component and the negative lens component of the third lens group $G_3$:

$$1.4 \leq |R7/R4| \tag{1}$$

The multiple cemented lens structure strongly diverges light rays by increasing the power of the negative lens component of the third lens group $G_3$ and the fourth lens group $G_4$. Increasing these components secures sufficiently long eye relief and corrects an image plane distortion aberration. Thus, the path of a light ray that has a wavelength shorter than the d-line is bent sharply upward relative to the d-line. Therefore, the lens surface closest to the eye point side exits from a position higher than the d-line. Conversely, a light ray that has a wavelength longer than the d-line exits from a position lower than the d-line, even if correction is made with the cemented surface of the third lens group $G_3$ and the second lens group $G_2$. Hence, even though chromatic aberration of magnification is corrected, the surrounding field of view appears yellow when the eyes are closer to the lens, and blue when the eyes are further from the lens. Formula (1) solves this problem.

Pursuant to formula (1), the radius of curvature R7 of the cemented surface of the third lens group $G_3$ is increased in order to decrease the negative power of the third lens group $G_3$. The radius of curvature R4 of the cemented surface of the second lens group $G_2$ is restricted in order to correct the excess chromatic aberration of magnification. If the lower limit of formula (1) is not attained, either the eye relief error due to wavelength is increased, or the chromatic aberration of magnification is overly corrected.

However, if the value of R7 is too large, the power of the negative lens of the third lens group $G_3$ is overly decreased, which makes it difficult to secure sufficiently large eye relief. Hence, the value of |R7/R4| preferably satisfies the formula:

$$|R_7/R_4| \leq 5.0 \tag{2}$$

The light ray must be bent upward, with the lens surface closer to the image planes, in order to secure sufficiently large eye relief. However, it is not desirable, from the point of view of image plane distortion aberration and astigmatism, to overly increase the power of the fourth lens group $G_4$ and the negative lens of the third lens group $G_3$. Hence the refraction index n6 of the positive lens of the third lens group $G_3$, due to d-line, preferably satisfies the formula:

$$1.55 \leq n6 \leq 1.75 \tag{3}$$

Formula (3) secures a sufficiently large eye relief by decreasing the power of the positive lens of the third lens group $G_3$ and the image plane distortion aberration. Astigmatism can also be corrected favorably by making the Petzval sum small. If n6 is larger than the upper limit of formula (3), the eye relief is shortened. If n6 is smaller than the lower limit, the image plane distortion aberration and the astigmatism worsen and the diameter of the lens are increased.

If the power of the positive lens of the third lens group $G_3$ decreases due to formula (3), the chromatic aberration of magnification is not corrected sufficiently. The difference between the Abbe Number υ6 of the positive lens of the third lens group $G_3$ and the Abbe Number υ7 of the negative lens of the third lens group $G_3$ must, thus, satisfy the formula:

$$υ6−υ7 \geq 25 \quad (4)$$

The chromatic aberration of magnification is not corrected sufficiently if formula (4) is not satisfied.

In order to correct the image plane distortion aberration, the radius of curvature R6 of the lens surface closest to the eye point of the third lens group $G_3$ is preferably restricted by the focal length f of the entire eyepiece lens system to satisfy the formula:

$$0.5 \leq (R_6/f) \leq 3.0 \quad (5)$$

If ($R_6$/f) becomes larger than the upper limit of formula (5), the image plane distortion aberration is overly corrected. If ($R_6$/f) becomes smaller than the lower limit, the image plane distortion aberration is not corrected sufficiently. The range specified by formula (5) guarantees favorable aberration correction. However, even better aberration correction is achieved by the formula:

$$0.8 \leq (R_6/f) \leq 1.2 \quad (6)$$

Figure 2:
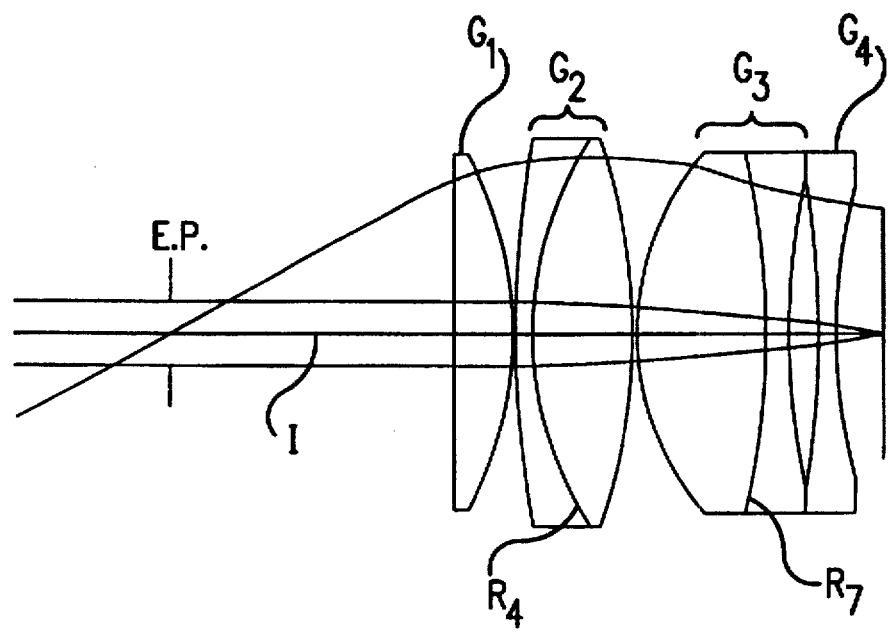
FIG. 2 is a side elevational view of another embodiment of an eyepiece lens in accordance with the invention.
Figure 5:
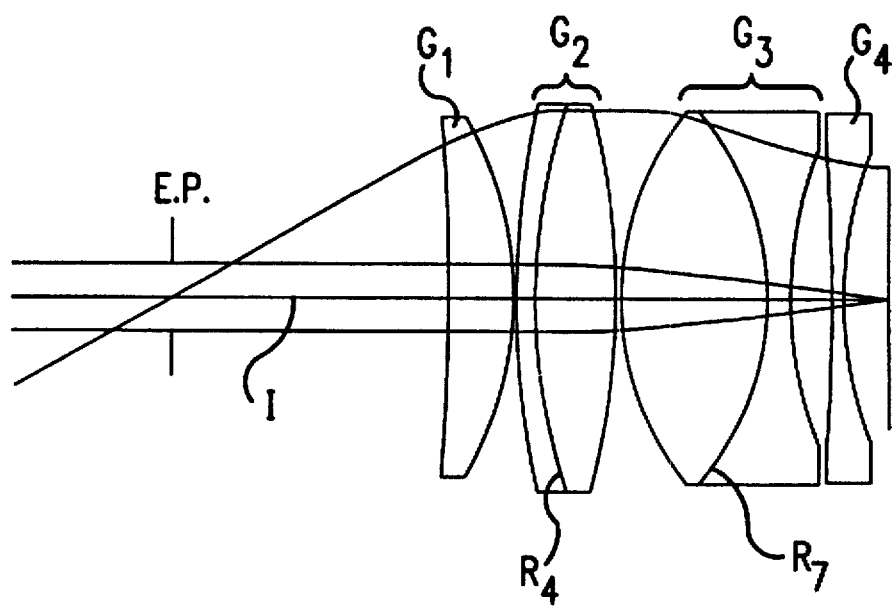
FIG. 5 is a side elevational view of an eyepiece lens in accordance with the related art.

FIG. 1 and FIG. 2 are side elevational views of two embodiments of an eyepiece lens in accordance with the present invention. FIG. 5 is a side elevational view of an eyepiece lens used as a control. All of the eyepiece lenses include the following components, in order from the eye point side, a first lens group $G_1$ that includes one positive lens component, a second lens group $G_2$ with positive refracting power that includes a cemented lens having a negative lens component and a positive lens component, a third lens group $G_3$ with positive refracting power that includes a cemented lens having a positive lens component and a negative lens component, and a fourth lens group $G_4$ that includes one negative lens component.

Various lens dimensions of the first and the second embodiment are listed in Table 1 and Table 2. Various lens dimensions of the eyepiece lens used as a control are listed in Table 3. In each table, the first column is the number of the lens surface in order from the image side, the second column is the radius of curvature R of the lens surface, the third column is the lens surface interval d, the fourth column is the value of the refraction index n relative to d-line ($\lambda$=587.6 nm), the fifth column is the value of the Abbe Number υ relative to d-line, and the sixth column is the lens group number.

Table 4 lists the values of the parameters in formulas (1)–(5), and the overall dimensions of the eyepiece lenses of FIGS. 1, 2 and 5. In Table 4, f is the focal length of the entire system, $I_d$ and $I_F$ are the eye relief relative to d-line and F-line respectively.

TABLE 1

| | R | d | n | υ |
|---|---|---|---|---|
| 1 | 8657.1 | 2.7 | 1.620 | 60.1 $G_1$ |
| 2 | −14.6 | 0.1 | | |
| 3 | 39.9 | 0.6 | 1.805 | 25.5 $G_2$ |
| 4 | 14.6 | 4.1 | 1.713 | 53.9 $G_2$ |
| 5 | −27.5 | 0.1 | | |
| 6 | 11.6 | 5.2 | 1.620 | 60.1 $G_3$ |

TABLE 1-continued

| | R | d | n | υ |
|---|---|---|---|---|
| 7 | −29.1 | 0.9 | 1.805 | 25.5 $G_3$ |
| 8 | 29.1 | 1.1 | | |
| 9 | −63.3 | 0.6 | 1.620 | 60.1 $G_4$ |
| 10 | 18.4 | | | |

TABLE 2

| | R | d | n | υ |
|---|---|---|---|---|
| 1 | 1751.6 | 2.7 | 1.620 | 60.1 $G_1$ |
| 2 | −14.6 | 0.1 | | |
| 3 | 39.9 | 0.6 | 1.805 | 25.5 $G_2$ |
| 4 | 13.9 | 4.1 | 1.713 | 53.9 $G_2$ |
| 5 | −27.5 | 0.1 | | |
| 6 | 10.8 | 5.2 | 1.564 | 60.7 $G_3$ |
| 7 | −36.7 | 0.9 | 1.805 | 25.5 $G_3$ |
| 8 | 29.1 | 1.1 | | |
| 9 | −63.3 | 0.6 | 1.620 | 60.1 $G_4$ |
| 10 | 18.4 | | | |

TABLE 3

| | R | d | n | υ |
|---|---|---|---|---|
| 1 | −52.9 | 2.7 | 1.620 | 60.1 $G_1$ |
| 2 | −14.6 | 0.1 | | |
| 3 | 44.3 | 0.6 | 1.805 | 25.5 $G_2$ |
| 4 | 25.3 | 3.5 | 1.713 | 53.9 $G_2$ |
| 5 | −27.5 | 0.1 | | |
| 6 | 12.7 | 6.0 | 1.797 | 45.4 $G_3$ |
| 7 | −11.7 | 0.9 | 1.805 | 25.5 $G_3$ |
| 8 | 19.0 | 1.6 | | |
| 9 | −63.3 | 0.6 | 1.620 | 60.1 $G_4$ |
| 10 | 18.4 | | | |

TABLE 4

| | | Embodiment Number | 1 | 2 | Control |
|---|---|---|---|---|---|
| | | f | 10.0 | 10.0 | 10.0 |
| | | $I_d$ | 11.027 | 11.037 | 10.973 |
| | | $I_F − I_d$ | 0.098 | 0.096 | 0.242 |
| (1) | (2) | lR7/R4l | 1.993 | 2.640 | 0.464 |
| (3) | | n6 | 1.620 | 1.564 | 1.797 |
| (4) | | υ6−υ7 | 34.2 | 35.2 | 19.9 |
| (5) | | lR6/fl | 1.165 | 1.076 | 1.266 |

Figure 3:
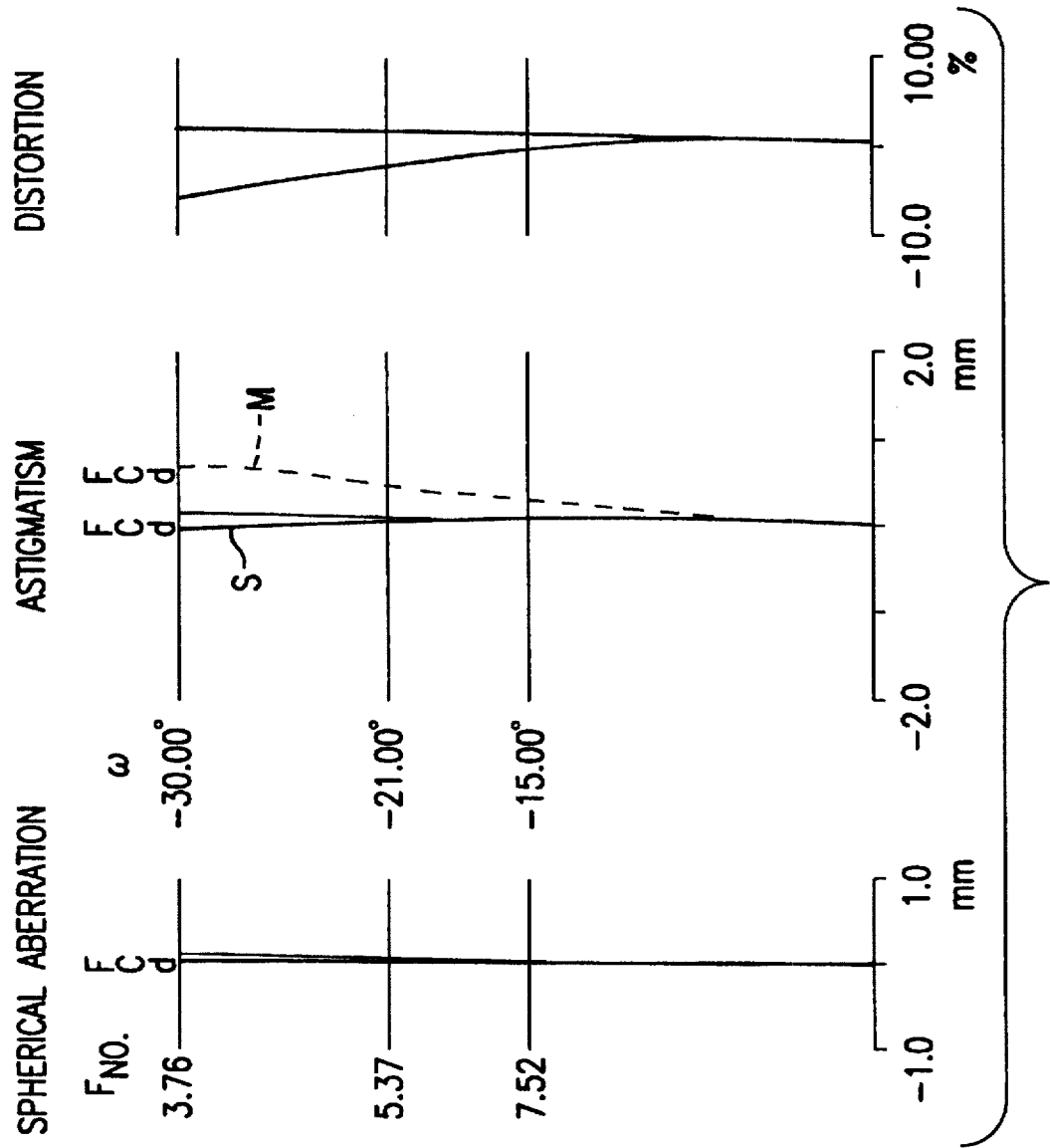
FIG. 3 is a schematic showing aberration of the eyepiece lens of FIG. 1.
Figure 4:
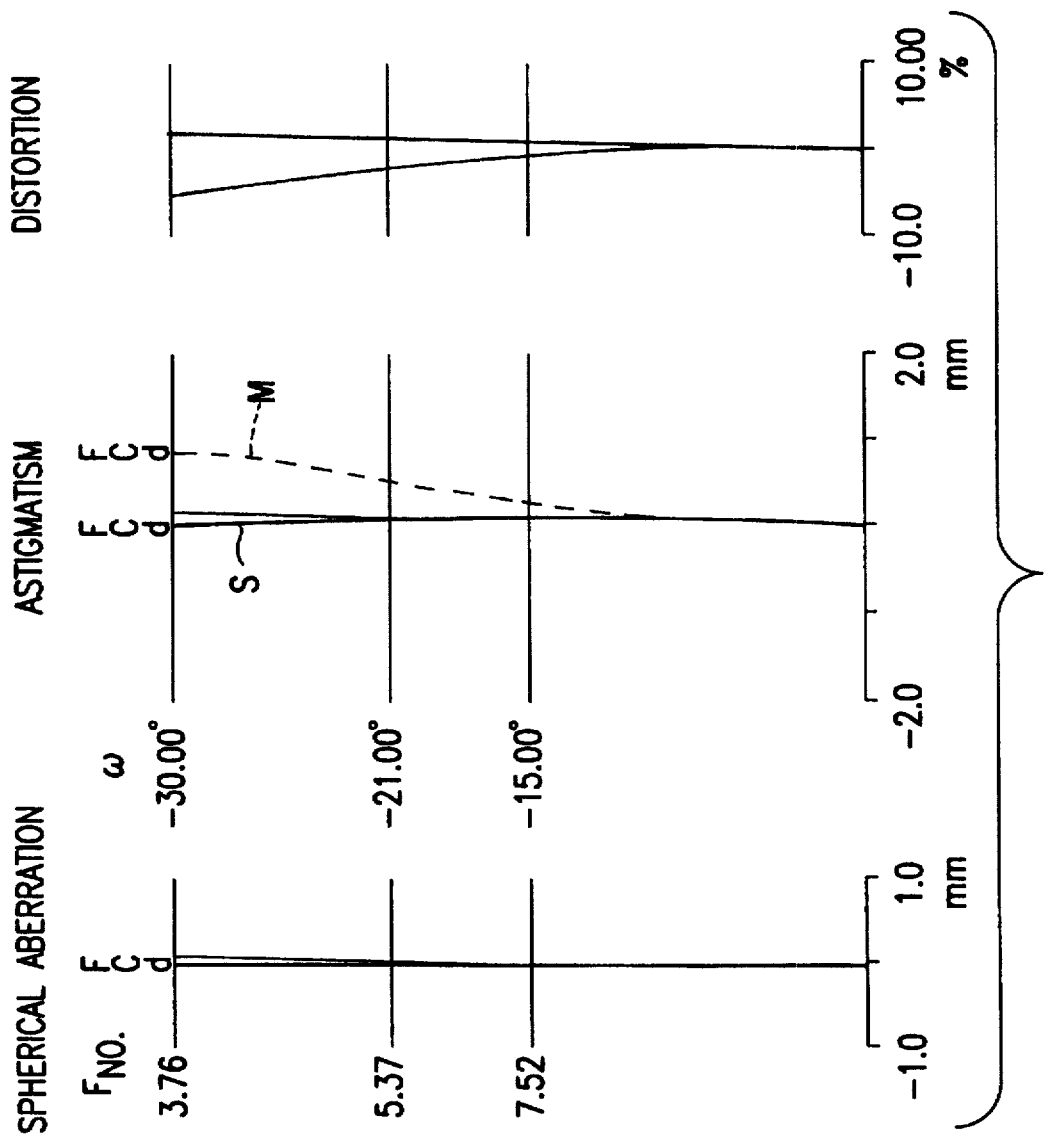
FIG. 4 is a schematic showing aberration of the eyepiece lens of FIG. 2.
Figure 6:
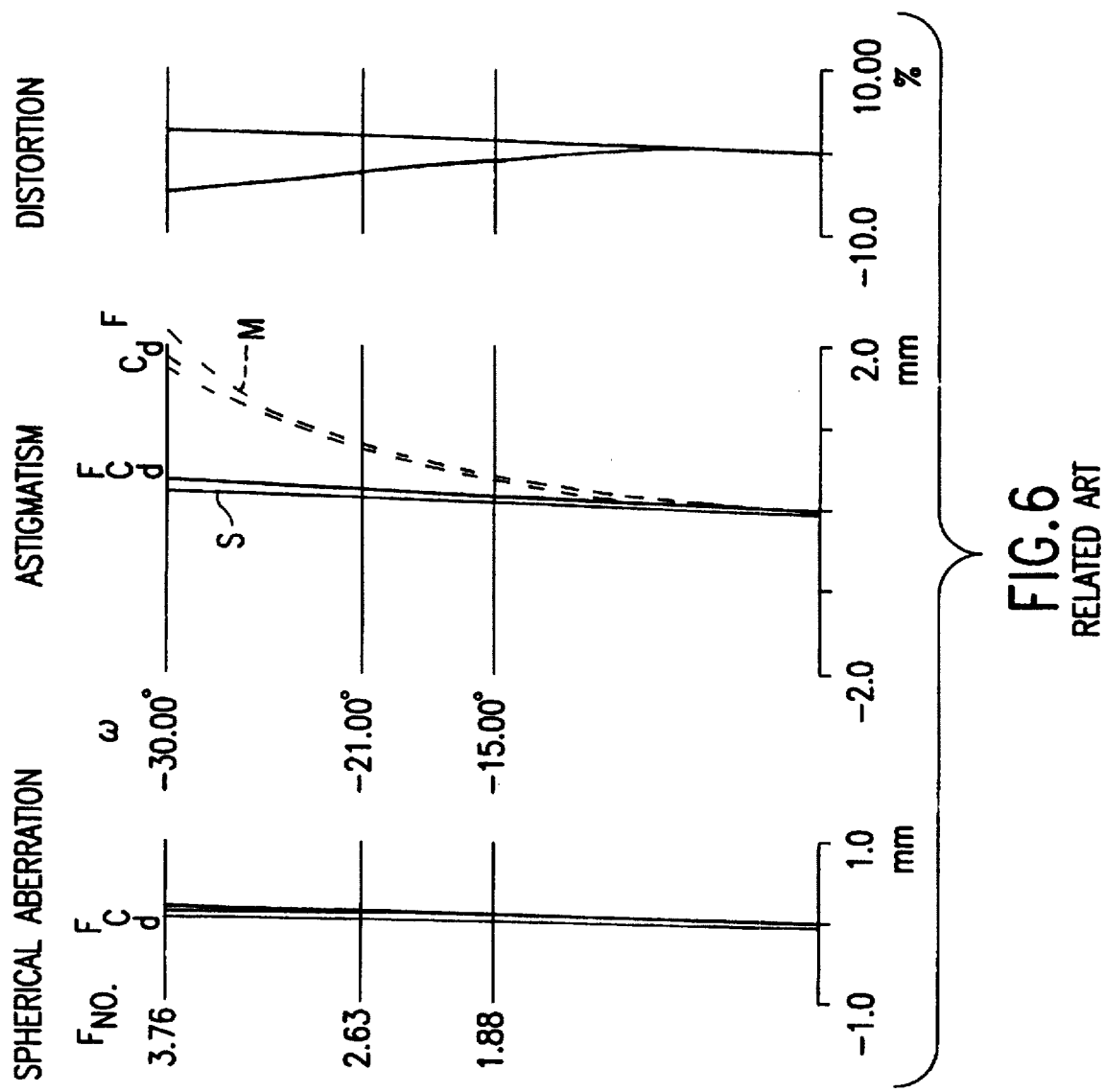
FIG. 6 is a schematic showing aberration of the eyepiece lens of FIG. 5.

FIGS. 3 and 4 show the spherical aberration, astigmatism and distortion aberration of the eyepiece lenses of FIGS. 1 and 2. FIG. 6 shows the same aberrations of the eyepiece lens of FIG. 5. In FIGS. 3, 4 and 6, the broken line shows the meridional image plane, and the solid line shows the sagittal image plane. In each figure, $F_{no}$ is the F-number, and ω is half of the apparent field.

The control eyepiece lens does not satisfy formulas (1), (3) or (4). The eye relief I error due to wavelength is large, and not all of the aberrations are corrected satisfactorily. However, the eyepiece lenses of FIGS. 1 and 2 satisfy formulas (1)–(5), the eye relief I is sufficiently large, the eye relief I error due to the wavelength is small, and all the aberrations are corrected sufficiently.

Figure 7:
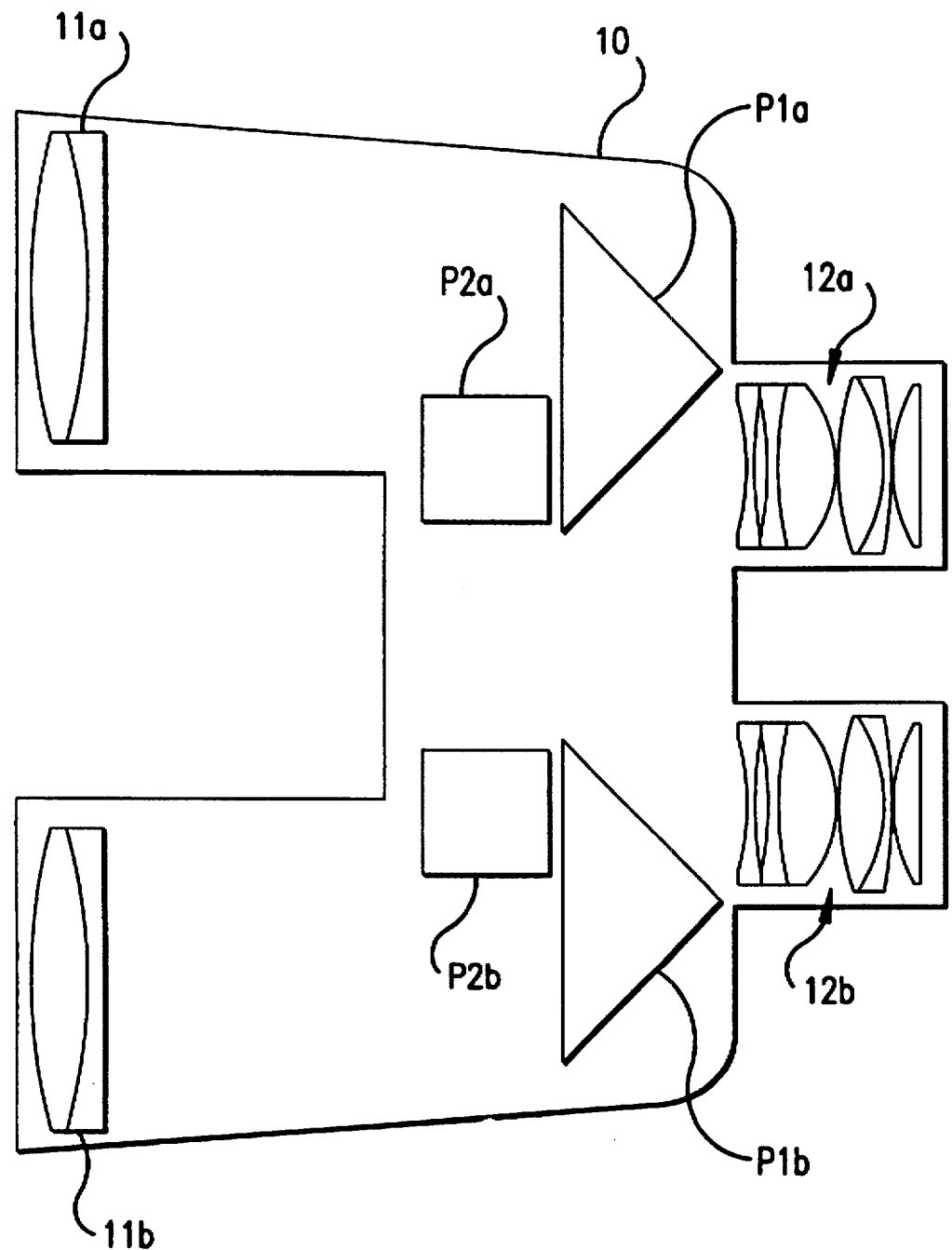
FIG. 7 is a side elevational view of an eyepiece lens system in accordance with another embodiment of the present invention.

FIG. 7 is a side elevational view of an eyepiece lens system in accordance with another embodiment of the present invention. Specifically, FIG. 7 shows a binocular lens system that incorporates the eyepiece lenses of the present invention. Objective lenses 11a, 11b, double Porro prisms P1a, P2a, P1b, P2b, and eyepiece lens systems 12a, 12b are installed in a case 10.

Only one side of the optical system (11a, P1a, P2a, and 12a) is explained below as this optical system is the same as optical system 11b, P1b, P2b, and 12b. Double Porro prisms consist of two right-angle prisms P1a, P2a, which are positioned between the objective lens 11a and an intermediate image that is formed by the objective lens 11a. Light passes through the objective lens and is reflected by four reflecting surfaces of double Porro prisms P1a, P2a, before reaching the intermediate image. In this case, the intermediate image is an erected image. The eyepiece lens system 12a is arranged behind the intermediate image. This eyepiece lens system has a lens data according to either Table 1, 2 or 3.

Additionally, the binocular lens system of FIG. 7 can use a Pechan prism instead of a double Porro prism.

The eyepiece lens of the present invention corrects various aberrations, the eye relief is sufficiently large, and eye relief errors due to wavelength are eliminated. Hence, the eyepiece lens of the present invention maintains natural color of the view field, even when a user moves its eyes closer or further away from the lens.

What is claimed is:

1. An eyepiece lens that has an apparent field of no less than 40°, and minimizes eye relief error, the eye relief including a distance between a lens surface closest to an eye point side in the eyepiece lens and an eye point, comprising:

from the eye point, a first lens means that includes one positive lens component, a second lens means with positive refracting power that includes a cemented lens means having a negative lens component and a positive lens component, a third lens means with positive refracting power that includes a cemented lens having a positive lens component and a negative lens component, and a fourth lens means that includes one negative lens component; and means for configuring the eyepiece lens such that $1.4 \leq |R7/R4|$, wherein R4 is a radius of curvature of a cemented surface of the negative lens component and the positive lens component of the second lens group G2, and R7 is a radius of curvature of a cemented surface of the positive lens component and the negative lens component of the third lens group G3.

2. An eyepiece lens according to claim 1, further comprising means for configuring the eyepiece lens such that $|R7/R4| \leq 5.0$.

3. An eyepiece lens according to claim 2, further comprising means for configuring the eyepiece lens such that $1.55 \leq n6 \leq 1.75$, and $v6-v7 \geq 25$, wherein n6 and v6 are a refraction index and an Abbe Number respectively due to d-line of the positive lens component of the third lens group G3, and v7 is an Abbe Number due to d-line of the negative lens component of the third lens group G3.

4. An eyepiece lens according to claim 2, further comprising means for configuring the eyepiece lens such that $0.5 \leq (R6/f) \leq 3.0$, wherein f is a focal length of the entire eyepiece lens system, R6 is a radius of curvature of a lens surface closest to the eye point side in the third lens group G3.

5. An eyepiece lens according to claim 1, further comprising means for configuring the eyepiece lens such that $1.55 \leq n6 \leq 1.75$, and $v6-v7 \geq 25$, wherein n6 and v6 are a refraction index and an Abbe Number respectively due to d-line of the positive lens component of the third lens group G3, and v7 is an Abbe Number due to d-line of the negative lens component of the third lens group G3.

6. An eyepiece lens according to claim 5, further comprising means for configuring the eyepiece lens such that $0.5 \leq (R6/f) \leq 3.0$, wherein f is a focal length of the entire eyepiece lens system, R6 is a radius of curvature of a lens surface closest to the eye point side in the third lens group G3.

7. An eyepiece lens according to claim 1, further comprising means for configuring the eyepiece lens such that $0.5 \leq (R6/f) \leq 3.0$, wherein f is a focal length of the entire eyepiece lens system, R6 is a radius of curvature of a lens surface closest to the eye point side in the third lens group G3.

8. An eyepiece lens that has an apparent field of no less than 40°, and minimizes eye relief error, the eye relief including a distance between a lens surface closest to an eye point side in the eyepiece lens and an eye point, comprising:

an assembly of lens groups including, from the eye point, a first lens group G1 that includes one positive lens component, a second lens group G2 with positive refracting power that includes a cemented lens having a negative lens component and a positive lens component, a third lens group G3 with positive refracting power that includes a cemented lens having a positive lens component and a negative lens component, and a fourth lens group G4 that includes one negative lens component; and the assembly of lens groups is configured such that $1.4 \leq |R7/R4|$, wherein R4 is a radius of curvature of a cemented surface of the negative lens component and the positive lens component of the second lens group G2, and R7 is a radius of curvature of a cemented surface of the positive lens component and the negative lens component of the third lens group G3.

9. An eyepiece lens according to claim 8, wherein the assembly of lens groups is configured such that $|R7/R4| \leq 5.0$.

10. An eyepiece lens according to claim 9, wherein the assembly of lens groups is configured such that $1.55 \leq n6 \leq 1.75$, and $v6-v7 \geq 25$, wherein n6 and v6 are a refraction index and an Abbe Number respectively due to d-line of the positive lens component of the third lens group G3, and v7 is an Abbe Number due to d-line of the negative lens component of the third lens group G3.

11. An eyepiece lens according to claim 9, wherein the assembly of lens groups is configured such that $0.5 \leq (R6/f) \leq 3.0$, wherein f is a focal length of the entire eyepiece lens system, R6 is a radius of curvature of a lens surface closest to the eye point side in the third lens group G3.

12. An eyepiece lens according to claim 8, wherein the assembly of lens groups is configured such that $1.55 \leq n6 \leq 1.75$, and $v6-v7 \geq 25$, wherein n6 and v6 are a refraction index and an Abbe Number respectively due to d-line of the positive lens component of the third lens group G3, and v7 is an Abbe Number due to d-line of the negative lens component of the third lens group G3.

13. An eyepiece lens according to claim 12, wherein the assembly of lens groups is configured such that $0.5 \leq (R6/f) \leq 3.0$, wherein f is a focal length of the entire eyepiece lens system, R6 is a radius of curvature of a lens surface closest to the eye point side in the third lens group G3.

14. An eyepiece lens according to claim 8, wherein the assembly of lens groups is configured such that $0.5 \leq (R6/f) \leq 3.0$, wherein f is a focal length of the entire eyepiece lens system, R6 is a radius of curvature of a lens surface closest to the eye point side in the third lens group G3.

15. An apparatus comprising:

an objective optical system;

a plurality of reflecting surfaces, and an eyepiece lens that has an apparent field of no less than 40°, and minimizes eye relief error, the eye relief including a distance between a lens surface closest to an eye point side in the eyepiece lens and an eye point, comprising:

an assembly of lens groups including, from the eye point, a first lens group G1 that includes one positive lens component, a second lens group G2 with positive refracting power that includes a cemented lens having a negative lens component and a positive lens component, a third lens group G3 with positive refracting power that includes a cemented lens having a positive lens component and a negative lens component, and a fourth lens group G4 that includes one negative lens component; and the assembly of lens groups is configured such that $1.4 \leq |R7/R4|$, wherein R4 is a radius of curvature of a cemented surface of the negative lens component and the positive lens component of the second lens group G2, and R7 is a radius of curvature of a cemented surface of the positive lens component and the negative lens component of the third lens group G3;

wherein the plurality of reflecting surfaces are positioned between the objective system and the eyepiece, and the eyepiece lens is arranged adjacent to an image formed by the objective.

16. An apparatus according to claim 15, wherein the assembly of lens group is configured such that $|R7/R4| \leq 5.0$.

17. An apparatus according to claim 15, wherein the assembly of lens groups is configured such that $1.55 \leq n6 \leq 1.75$, and $\nu6 - \nu7 \geq 25$, wherein n6 and $\nu6$ are a refraction index and an Abbe Number respectively due to d-line of the positive lens component of the third lens group G3, and $\nu7$ is an Abbe Number due to d-line of the negative lens component of the third lens group G3.

18. An apparatus according to claim 15, wherein the assembly of lens groups is configured such that $0.5 \leq (R6/f) \leq 3.0$, wherein f is a focal length of the entire eyepiece lens, R6 is a radius of curvature of a lens surface closest to the eye point side in the third lens group G3.

* * * * *